Figure 1:
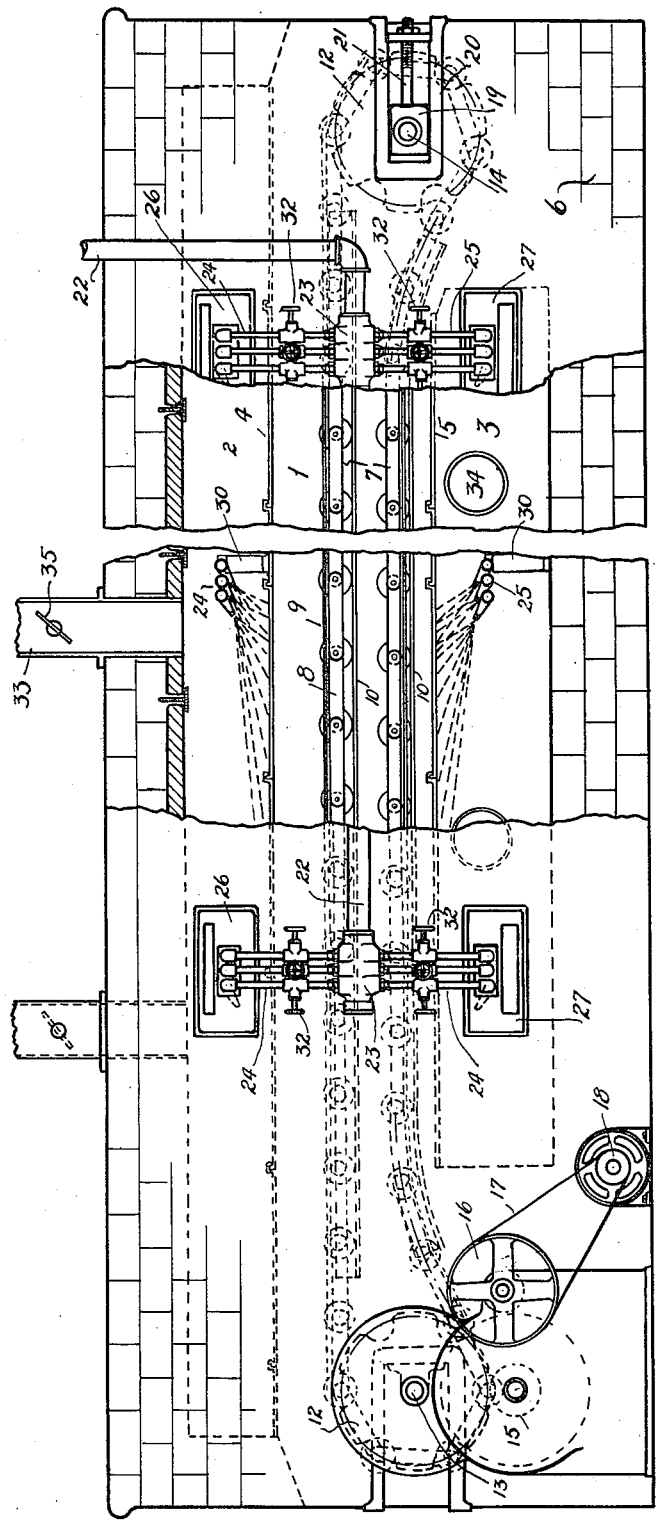

Sept. 11, 1923.

I. ELLIOTT

CONTINUOUS BAKING OVEN

Filed May 17, 1922

1,467,310

2 Sheets-Sheet 1

INVENTOR
Irwin Elliott
BY
T. F. Bourne
ATTORNEY

Sept. 11, 1923.　　　　　　　　　　　　　　　　　1,467,310
I. ELLIOTT
CONTINUOUS BAKING OVEN
Filed May 17, 1922　　　2 Sheets-Sheet 2
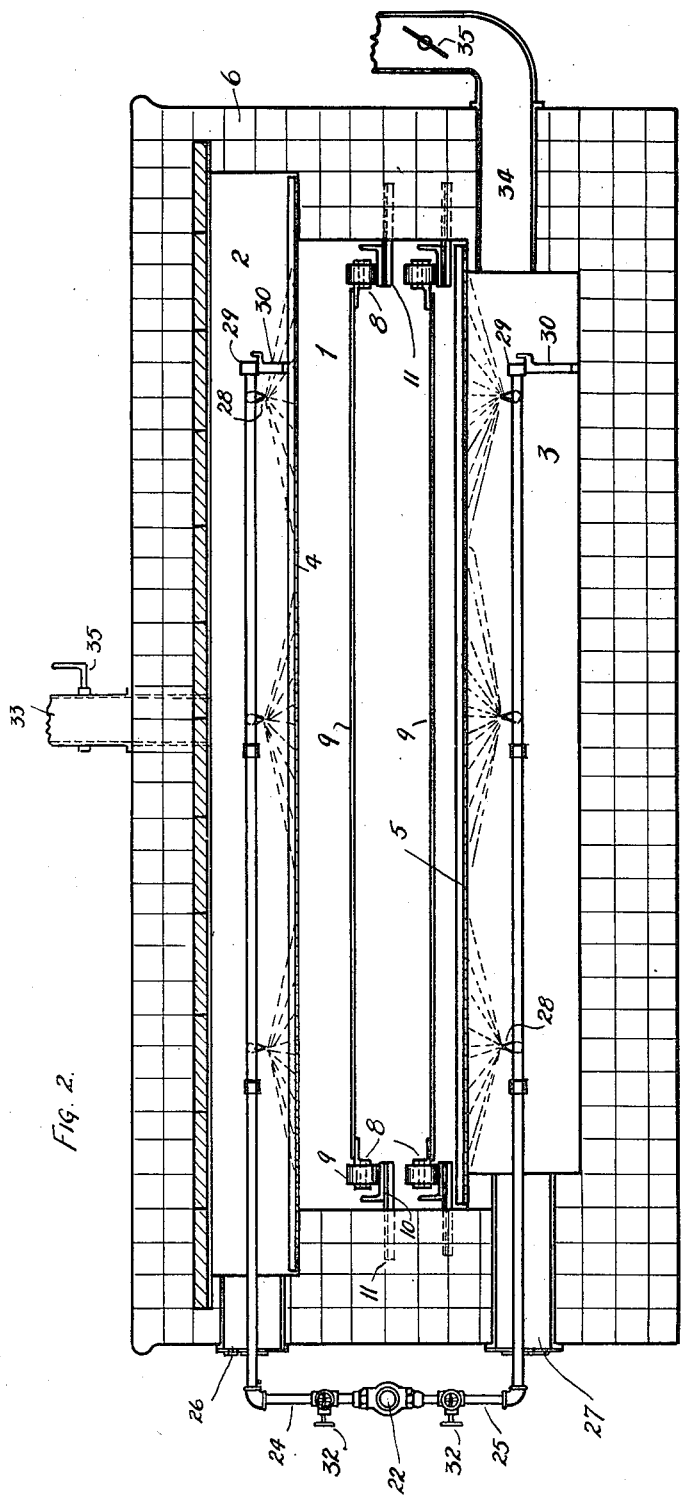
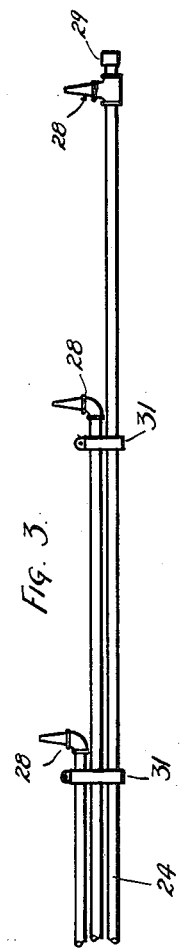
INVENTOR
Irwin Elliott
BY
T. F. Bourne
ATTORNEY Patented Sept. 11, 1923.

1,467,310

UNITED STATES PATENT OFFICE.

IRWIN ELLIOTT, OF NEW YORK, N. Y.

CONTINUOUS BAKING OVEN.

Application filed May 17, 1922. Serial No. 561,583.

*To all whom it may concern:*

Be it known that I, IRWIN ELLIOTT, a citizen of the United States, and resident of New York city, borough of the Bronx, in the county of the Bronx and State of New York, have invented certain new and useful Improvements in Continuous Baking Ovens, of which the following is a specification.

My invention has reference to improvements in the class of baking ovens in which dough, batter and the like may travel through the oven at a desired rate of speed to bake the material.

Heretofore, so far as I am aware, it has been customary to heat continuous baking ovens by means of heated air passed through the oven in contact with the material to be baked, or by means of gas flames within the oven.

A principal object of my invention is to provide means for heating baking ovens by the use of liquid fuel, such as petroleum oil or the like, to produce heating flame without permitting the oil or products of combustion from the oil to come in contact with the material being baked.

In carrying out my invention I provide a baking oven or chamber provided with means to convey therethrough the material to be baked, heating chambers above and below said oven and in thermal relation thereto, and means within said heating chambers to burn liquid fuel for production of the desired heat for the oven, said chambers and oven being separated so that oil and products of combustion from the heating chambers will not enter the oven.

My invention also comprises novel details of improvement that will be more fully hereinafter set forth and then pointed out in the claims.

Reference is to be had to the accompanying drawings forming part hereof, wherein Fig. 1 is a partly broken side elevation of a continuous baking oven embodying my invention, Fig. 2 is a cross-section of Fig. 1, and Fig. 3 is a detail plan of the oil burners.

The numeral 1 indicates a baking oven, and at 2, 3 are heating chambers respectively above and below the oven. Between said oven and chambers are walls or partitions 4, 5, which are preferably made of relatively thin sheets of metal to permit the ready transmission of heat from said chambers to said oven. The oven and chambers may be formed within a suitable enclosure, such as walls 6 of brick, concrete, or other non-heat conducting material. A conveyor is indicated at 7 which may comprise spaced endless chains 8, provided with cross bars or slats 9, upon which pans for the material to be baked, or loaves of dough, batter or the like, may be placed. The chains 8 are shown provided with rollers 9 adapted to travel upon tracks 10 shown supported upon brackets or extensions 11 projecting into the oven from the side walls of the casing. The conveyor chains are supported in an ordinary way upon spaced sprocket wheels 12 carried by shafts 13, 14 journalled in bearings at opposite ends of the casing. Suitable gearing 15 operated by drive-wheel 16, receiving belt 17 from a motor 18, may operate sprocket 12 to cause the conveyor to travel within the oven. The shaft 14 is shown supported in bearing blocks 19 adjustable in guides 20 and connected with screws 21, whereby shaft 14 may be adjusted to tension the conveyor.

I provide means to heat the chambers 2, 3 and to vary the heat, as desired, in different portions of said chambers, so that such heat will be transmitted to the oven, both above and below the material to be baked therein, for baking said material as it passes through the oven. I have illustrated means to burn liquid fuel, such as fuel oil, within the chambers 2, 3. A supply pipe for the liquid fuel is indicated at 22, shown extending along outside of casing 6 adapted to receive liquid fuel from a supply source, such as a tank (not shown), to supply the fuel under pressure. The pipe 22 is provided with suitable fittings 23 from which extend pipes 24, 25, which extend laterally into chambers 2, 3 respectively through openings 26, 27 in the side walls of casing 6. I have shown the pipes 24, 25 arranged in parallel series of three each and of different lengths within the chambers, which pipes at their inner ends are provided with jets or burners 28, of any suitable construction, for the delivery of liquid fuel within the heating chambers. The longer of said pipes are shown closed at the inner ends by caps 29 and supported within chambers 2, 3 by brackets or the like 30. In the example illustrated the several pipes of a series are connected by straps or the like 31 to retain the pipes in operative relation. Each of the pipes 24, 25 is shown provided with a valve 32, whereby the flow of liquid fuel through the corresponding pipe may be controlled as desired. I have shown the jets or nozzles 28 of each series of pipes as spaced apart transversely within the corresponding heating chambers, so that the flames may be spaced apart transversely within such chambers. The several series of pipes 24, 25 are also shown spaced apart in the direction of the length of the heating chambers, and any desired number of series of such pipes may be located in each of the chambers. Air to support combustion may enter the chambers through the openings 26, 27 and heated products of combustion may pass from the chambers through flues 33, 34, respectively, which flues may be provided with dampers 35. By preference the burners 28 will be directed from their corresponding pipes in an angular direction toward the walls or partitions 4, 5.

In operation of my invention, the liquid fuel under desired pressure is controlled by valves 32 to produce flames at burners 28, according to the heat required at various parts of the oven, and the heat generated in the chambers 2 and 3 will be transmitted to the oven through the walls or partitions 4, 5, both above and below the conveyor. By suitably controlling the flow of fuel from any of the burners 28, the heat in the adjacent zone of the oven may be increased or diminished according to the requirements of the material being baked, and whereby overbaking or under-baking of the material at any part of the oven may be controlled as the material is carried along within the oven by the conveyor.

Since the heating chambers 2 and 3 are entirely separated from the oven, the gases and products of combustion from burning the fuel oil in the heating chambers, as well as any residue oil that might drip from the burners or pipes in the heating chambers, is prevented from having access to the conveyor or the material thereon, hence the bread, cakes and the like baked in the oven, are kept from contamination.

An advantage of my invention is that I am enabled to bake food products by the use of fuel oil or other petroleum oil products, such as kerosene, to reduce the cost of heating the oven and without danger of contact of the articles being baked with injurious products of combustion, oil or the like. While I have referred to the use of fuel oil it will be understood that gas for combustion may be supplied through the pipes to the burners or jets.

Having now described my invention, what I claim is:

1. In a continuous baking oven, a casing having an oven and heating chambers on opposite sides thereof in thermal relation to the oven, means to convey material to be baked within the oven, a supply pipe for fluid fuel, branch pipes extending from the supply pipe into said chambers and provided with burners therein, and means to control the flow of fuel from said burners, said burners being spaced apart transversely in said chambers.

2. In a continuous baking oven, a casing having an oven and heating chambers on opposite sides thereof in thermal relation to the oven, means to convey material to be baked within the oven, a supply pipe for fluid fuel, branch pipes extending from the supply pipe into said chambers and provided with burners therein, and means to control the flow of fuel from said burners, said burners being arranged in series spaced apart in said chambers, the burners of each series being transversely spaced apart.

3. In a continuous baking oven, a casing having an oven and heating chambers on opposite sides thereof in thermal relation to the oven, means to convey material to be baked within the oven, a supply pipe for fluid fuel, branch pipes extending from the supply pipe into the corresponding chambers and arranged in series spaced apart within said chambers, the pipes of each series having burners spaced apart transversely within the corresponding chamber.

4. In a continuous baking oven, a casing having an oven and heating chambers on opposite sides thereof in thermal relation to the oven, means to convey material to be baked within the oven, a supply pipe for fluid fuel, branch pipes of different lengths extending from the supply pipe into the corresponding chamber, each of the branch pipes being provided with a burner, said burners being spaced apart transversely within the corresponding chamber.

IRWIN ELLIOTT.